(12) United States Patent
Kim

(10) Patent No.: US 9,321,442 B2
(45) Date of Patent: Apr. 26, 2016

(54) MASTER CYLINDER AND BRAKE SYSTEM USING THE SAME

(71) Applicant: HYUNDAI MOBIS CO., LTD., Seoul (KR)

(72) Inventor: Jong Sung Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 1 day.

(21) Appl. No.: 14/249,179

(22) Filed: Apr. 9, 2014

(65) Prior Publication Data

US 2015/0061357 A1  Mar. 5, 2015

(30) Foreign Application Priority Data

Sep. 3, 2013  (KR) .................. 10-2013-0105676

(51) Int. Cl.
*B60T 11/224* (2006.01)
*B60T 11/10* (2006.01)
*B60T 13/58* (2006.01)
*B60T 8/26* (2006.01)

(52) U.S. Cl.
CPC ............... *B60T 11/224* (2013.01); *B60T 8/267* (2013.01); *B60T 11/103* (2013.01); *B60T 13/58* (2013.01)

(58) Field of Classification Search
CPC ......... B60T 11/20; B60T 11/24; B60T 11/16; B60T 11/165; B60T 11/224
USPC .............................. 60/574, 575, 576, 577, 578
See application file for complete search history.

(56) References Cited

U.S. PATENT DOCUMENTS

| | | | | |
|---|---|---|---|---|
| 2,291,056 | A | * | 7/1942 | Pallady ............................ 60/578 |
| 2,313,274 | A | * | 3/1943 | Schnell ............................ 60/577 |
| 2,508,403 | A | * | 5/1950 | Knauss ............................ 60/576 |
| 6,161,903 | A | * | 12/2000 | Dieringer ..................... 303/114.1 |
| 8,209,977 | B2 | * | 7/2012 | Klimes et al. ..................... 60/577 |
| 2001/0038243 | A1 | * | 11/2001 | Isono .......................... 303/116.1 |
| 2008/0257669 | A1 | * | 10/2008 | Reuter et al. ................... 188/352 |
| 2015/0061361 | A1 | * | 3/2015 | Maruo et al. ..................... 303/10 |
| 2015/0115701 | A1 | * | 4/2015 | Koo ................................ 303/20 |

FOREIGN PATENT DOCUMENTS

DE        19949159 C1 *  2/2001  ............. B60T 11/16

OTHER PUBLICATIONS

Machine Translation of DE 19949159 (no date).*

* cited by examiner

*Primary Examiner* — Nicholas J Lane
(74) *Attorney, Agent, or Firm* — Knobbe Martens Olson & Bear LLP

(57) ABSTRACT

A master cylinder including: a primary chamber; a first piston which is provided in the primary chamber, and has one portion that is moved to the outside of the primary chamber by pressing a pedal; a secondary chamber which is provided to be adjacent to the primary chamber; a second piston which is provided in the secondary chamber, and has one portion that protrudes to the outside of the secondary chamber and is provided to be spaced apart from the first piston at a predetermined interval; and a hydraulic line which connects the primary chamber and the secondary chamber, and is connected with a wheel cylinder, in which the first piston is moved by pressing the pedal, and after the first piston is moved at a predetermined interval, the first piston and the second piston come into contact with each other, and are moved together.

13 Claims, 5 Drawing Sheets

MASTER CYLINDER AND BRAKE SYSTEM USING THE SAME

CROSS-REFERENCE TO RELATED APPLICATIONS

This application claims priority to and the benefit of Korean Patent Application No. 10-2013-0105676 filed in the Korean Intellectual Property Office on Sep. 3, 2013, the entire contents of which are incorporated herein by reference.

TECHNICAL FIELD

The present invention relates to a master cylinder and a brake system using the same, and more particularly, to a master cylinder and a brake system using the same which may implement a pedal feel, which is similar to a pedal feel in a hydraulic brake system that uses a booster, in a brake system which directly transmits hydraulic pressure without using a booster.

BACKGROUND ART

In general, braking force was produced using four hydraulic brakes in a brake system for a vehicle, but recently, usage of an electronic brake tends to gradually increase because of development of the electronic brake.

The hydraulic brake and the electronic brake each have advantages and disadvantages. For example, in a case in which the electronic brake is applied to all vehicle wheels, electric power consumption, which is accompanied with an operation of the electronic brake, is increased, and braking force cannot absolutely be obtained in the case of failure of the electric system. Therefore, a method of using the electronic brake for front wheels, and using the hydraulic brake for rear wheels may be considered.

FIG. 1 is a view illustrating a configuration of a combined brake system.

Referring to FIG. 1, a combined brake system 10 has a configuration in which a brake operation for the front wheels is performed by EMBs 13 and by an electric brake apparatus, and braking force for the rear wheels is produced through hydraulic brake calipers 14 by directly transmitting hydraulic pressure without using a booster.

A pedal unit 11 determines brake intention of a driver through an angle sensor or a stroke sensor, and sends the brake intention to an ECU 12 (controller). Without using the booster, braking force generated by the driver is boosted only by a multiple of a difference in cross-sectional area between a master cylinder and a wheel cylinder of the caliper, and directly transmitted to hydraulic calipers 14 for the rear wheels. The aforementioned configuration that has no booster is possible because rear wheel braking force is smaller than front wheel braking force in terms of required braking force.

The ECU 12, which receives the brake intention, controls the front wheel EMB 13 so as to generate the front wheel braking force.

However, in the system 10 in which the electronic brake and the hydraulic brake are used together as described above, a configuration, which includes all constituent elements in the related art is difficult to configure a hydraulic brake apparatus.

Particularly, because a pedal feel is provided only by a rear wheel cylinder (hydraulic manner) having a small required liquid amount, there is a problem in that it is difficult to produce a normal pedal feel that is similar to a pedal feel in a system vehicle that uses a hydraulic brake system in the related art or a pedal simulator. A drum brake is more disadvantageous than a disk brake in terms of the required liquid amount.

FIG. 2 is a graph illustrating a relationship between pedal effort and a pedal stroke of a driver in a general hydraulic brake system.

The graph of FIG. 2 compares different pedal feels in accordance with types of vehicles, and although there are differences in extents, the pedal feels each commonly are divided into an ineffective stroke section, a primary pedal effort section A, a secondary pedal effort section B, and a pressure reduction section C.

Here, an important point is a difference in gradient between the primary pedal effort section A and the secondary pedal effort section B, and the difference in gradient occurs because of a boost limit (full load point) of the booster of the hydraulic brake apparatus. The gradient of the primary pedal effort section A is gentle because this section is boosted by the booster, and the gradient of the secondary pedal effort section B is rapidly increased because the boosting operation of the booster ends in this section.

However, in the combined brake system in the related art, only the primary pedal effort section is shown in a case in which the braking force is produced by simply connecting the existing master cylinder to a rear wheel hydraulic brake apparatus, and as a result, there is a problem in that the driver may feel heterogeneity regarding a brake operation. That is, there should be a section in which the pedal effort is rapidly increased in a section having a predetermined stroke or more, but otherwise the driver may feel inconvenience.

SUMMARY OF THE INVENTION

The present invention has been made in an effort to provide a master cylinder and a brake system using the same which may implement a pedal feel, which is similar to a pedal feel in a hydraulic brake system that uses a booster, in a brake system which directly transmits hydraulic pressure without using a booster.

An exemplary embodiment of the present invention provides a master cylinder including: a primary chamber; a first piston which is provided in the primary chamber, and has one portion that is moved to the outside of the primary chamber by pressing a pedal; a secondary chamber which is provided to be adjacent to the primary chamber; a second piston which is provided inside the secondary chamber, and has one portion that protrudes to the outside of the secondary chamber and is provided to be spaced apart from the first piston at a predetermined interval; and a hydraulic line which connects the primary chamber and the secondary chamber, and is connected with a wheel cylinder, in which the first piston is moved by pressing the pedal, and after the first piston is moved at a predetermined interval, the first piston and the second piston come into contact with each other, and are moved together.

The first piston may be formed in a cylindrical shape having a stepped portion.

The master cylinder may further include a connecting chamber which is provided between the primary chamber and the secondary chamber, accommodates the one portion of the first piston and the one portion of the second piston, and is directly connected with a reservoir.

The master cylinder may further include a first elastic member which is interposed between the first piston and the second piston, and provides elastic restoring force when the first piston and the second piston are moved.

The second piston may include a stopper which is provided to protrude from one region of an outer circumferential surface of the second piston, and comes into contact with an inner stepped portion of the secondary chamber so as to prevent the second piston from being moved away toward the outside of the secondary chamber.

The master cylinder may further include a second elastic member which is interposed between the second piston and an end portion of the secondary chamber, and provides elastic restoring force when the second piston is moved.

A hydraulic pressure transmission cross-sectional area of the first piston may be smaller than a hydraulic pressure transmission cross-sectional area of the second piston.

The predetermined interval may be set in consideration of a pedal ratio.

Another exemplary embodiment of the present invention provides a brake system including: an electronic brake which produces braking force for a front wheel; a hydraulic brake which produces braking force for a rear wheel; and the foregoing master cylinder which transmits hydraulic pressure to the hydraulic brake by pressing a pedal.

According to the master cylinder of the present invention and the brake system using the same, there is an effect in that a pedal feel, which is similar to a pedal feel in a hydraulic brake system that uses a booster, may be implemented in the brake system that directly transmits hydraulic pressure without using a booster.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
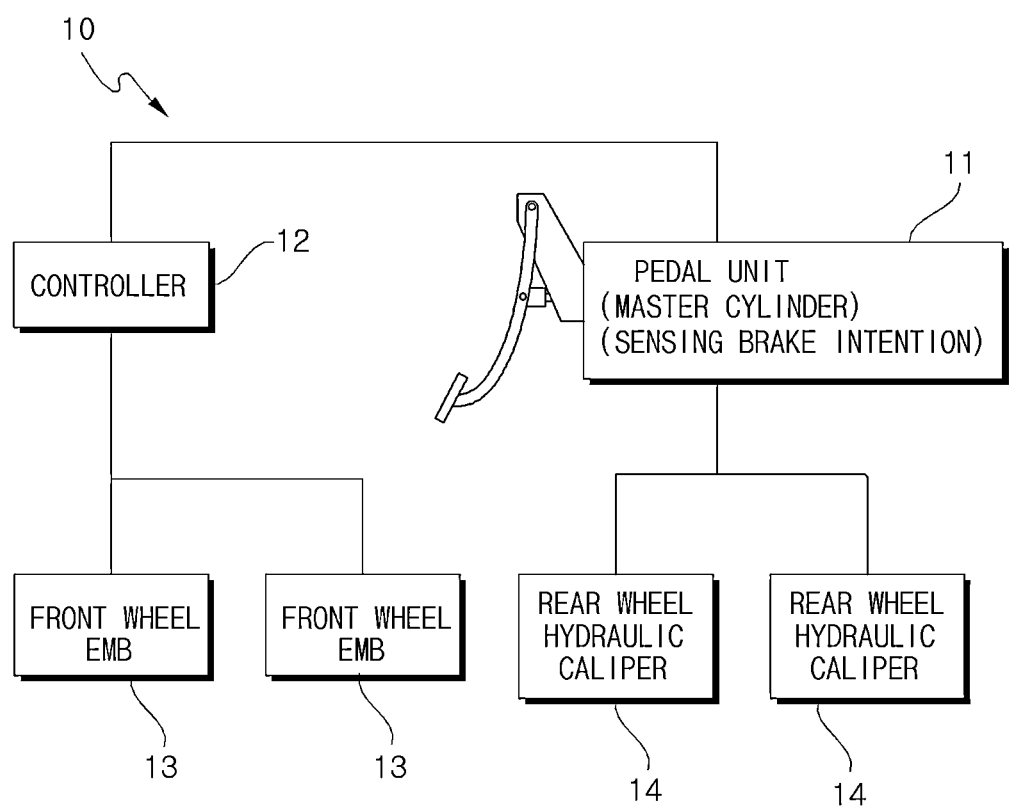
FIG. 1 is a view illustrating a configuration of a combined brake system.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, an exemplary embodiment of the present invention will be described in detail with reference to the accompanying drawings. First, in denoting reference numerals to constituent elements of respective drawings, it should be noted that the same elements will be designated by the same reference numerals although they are shown in different drawings. Hereinafter, an exemplary embodiment of the present invention will be described, but, of course, the technical spirit of the present invention is not restricted or limited thereto, but the exemplary embodiment of the present invention may be modified by a person with ordinary skill in the art to be variously performed.

Figure 3:
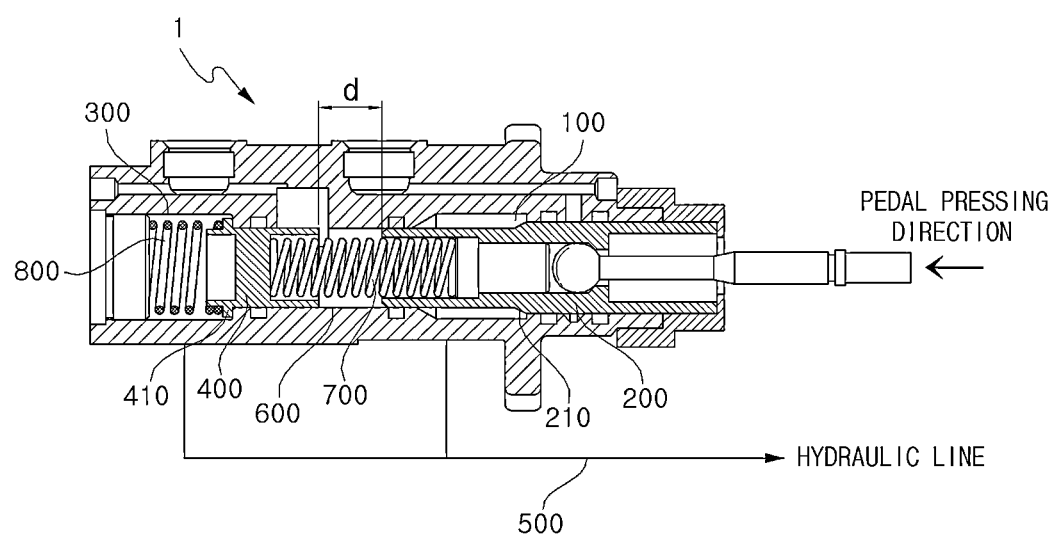
FIG. 3 is a longitudinal sectional view illustrating a structure of a master cylinder according to an exemplary embodiment of the present invention.
Figure 4:
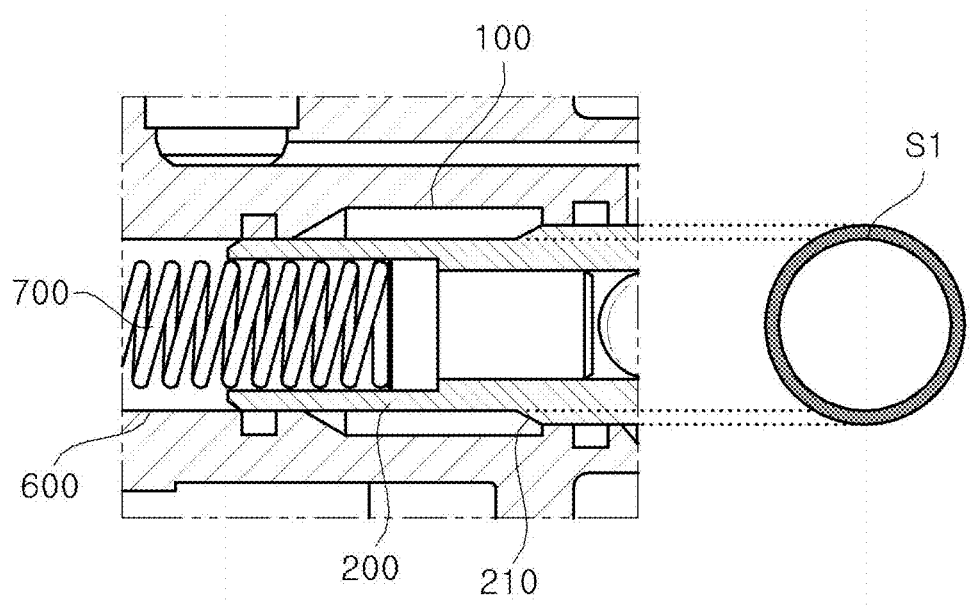
FIG. 4 is a view in which a primary chamber and a first piston of FIG. 3 are enlarged.
Figure 5:
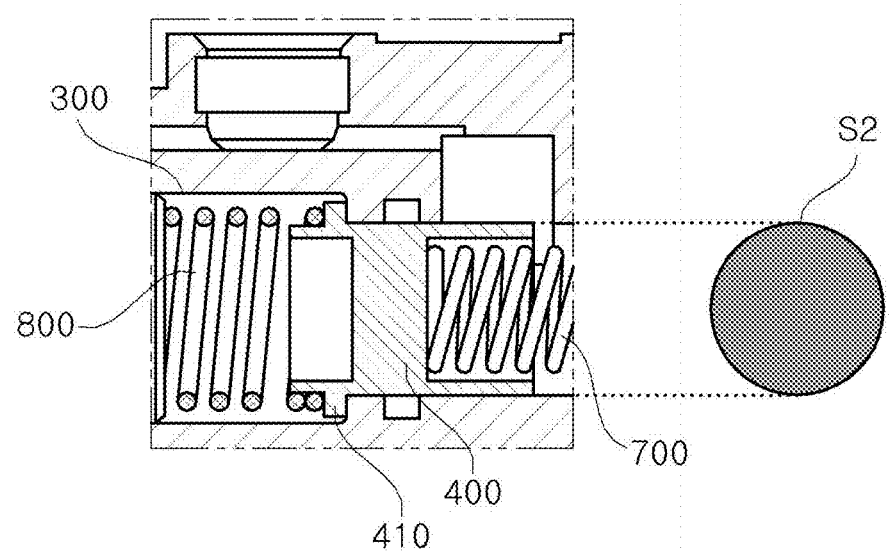
FIG. 5 is a view in which a secondary chamber and a second piston of FIG. 3 are enlarged.

FIG. 3 is a longitudinal sectional view illustrating a structure of a master cylinder according to an exemplary embodiment of the present invention, FIG. 4 is a view in which a primary chamber and a first piston of FIG. 3 are enlarged, and FIG. 5 is a view in which a secondary chamber and a second piston of FIG. 3 are enlarged.

FIGS. 3 to 5 clearly illustrate only main characteristic parts for conceptual and clear understanding of the present invention. As a result, various modifications to the illustrations are expected, and the scope of the present invention does not have to be limited to specific shapes illustrated in the drawings.

Referring to these drawings, a master cylinder 1 according to an exemplary embodiment of the present invention includes a primary chamber 100, a first piston 200 which is provided in the primary chamber 100, and has one portion that is moved to the outside of the primary chamber by pressing a pedal, a secondary chamber 300 which is provided to be adjacent to the primary chamber 100, a second piston 400 which is provided in the secondary chamber 300, and has one portion that protrudes to the outside of the secondary chamber 300 and is provided to be spaced apart from the first piston 200 at a predetermined interval, a hydraulic line 500 which connects the primary chamber 100 and the secondary chamber 300, and is connected with a wheel cylinder, and a connecting chamber 600 which is provided between the primary chamber 100 and the secondary chamber 300, accommodates the one portion of the first piston 200 and the one portion of the second piston 400, and is directly connected to a reservoir.

Referring to FIG. 3, the interior of the master cylinder 1 according to the exemplary embodiment of the present invention is configured by the primary chamber 100, the secondary chamber 300, and the connecting chamber 600.

The first piston 200 is provided in the primary chamber 100 such that hydraulic pressure in the primary chamber 100 is transmitted along the hydraulic line 500 depending on a movement of the first piston 200.

Referring to FIGS. 3 and 4, the first piston 200 is formed in a cylindrical shape having a stepped portion, a part of a front end portion of the first piston 200 protrudes to the outside of the primary chamber 100 so as to be disposed in the connecting chamber 600, and a rear end portion of the first piston 200 is moved in the primary chamber 100 so as to transmit hydraulic pressure as much as pressure that corresponds to a cross-sectional area S1 of the stepped portion 210. That is, the first piston 200 transmits hydraulic pressure with a hydraulic pressure transmission area, which corresponds to the cross-sectional area S1, inside the primary chamber 100.

The first piston 200 is moved when a driver presses the pedal. The portion of the first piston 200 which protrudes to the outside of the primary chamber 100 is moved by a predetermined interval d by pressing the pedal, and thereafter comes into contact with the second piston 400, such that the first piston 200 and the second piston 400 are moved together when the pedal is continuously pressed.

Referring to FIGS. 3 and 5, the second piston 400 is provided in the secondary chamber 300. The one portion of the second piston 400 protrudes to the outside of the secondary chamber 300 so as to be disposed in the connecting chamber 600. A hydraulic pressure transmission area of the second piston 400 which is designated by S2 as illustrated in FIG. 5 is formed to be greater than the hydraulic pressure transmission area S1 of the first piston 200.

The second piston 400 includes a stopper 410 that is provided to protrude from one region of an outer circumferential surface of the second piston 400, and comes into contact with an inner stepped portion of the secondary chamber 300 so as to prevent the second piston 400 from being moved away toward the outside of the secondary chamber 300.

The master cylinder 1 of the present exemplary embodiment further includes a first elastic member 700 which is interposed between the first piston 200 and the second piston 400, and provides elastic restoring force when the first piston 200 and the second piston 400 are moved, and a second elastic member 800 which is interposed between the second piston 400 and an end portion of the secondary chamber 300, and provides elastic restoring force when the second piston 400 is moved.

In the present exemplary embodiment, the first elastic member 700 and the second elastic member 800 each are provided as a coil spring.

An operation of the master cylinder 1 having the aforementioned configuration will be described below.

First, when the pedal is pressed, the first piston 200 is moved in a pedal pressing direction as illustrated in FIG. 3.

As the first piston 200 is moved, with the hydraulic pressure transmission area that corresponds to the cross-sectional area S1, hydraulic pressure is transmitted through the hydraulic line 500. In this case, the hydraulic pressure being transmitted is also transmitted to the wheel cylinder, and the hydraulic pressure is also transmitted to the secondary chamber 300 that is connected with the primary chamber 100 through the hydraulic line 500.

Since the first piston 200 and the second piston 400 are spaced apart from each other at the predetermined interval d, the second piston 400 is not moved until the first piston 200 comes into contact with the second piston 400 by pressing the pedal.

The hydraulic pressure transmitted from the primary chamber 100 to the secondary chamber 300 moves the second piston 400 in a direction reverse to the movement direction of the first piston 200. In this case, the second piston 400 is not moved away toward the outside of the secondary chamber 300, and stopped by the stopper 410 that is formed on the second piston 400.

As such, a section in which the first piston 200 is moved by the predetermined interval 'd' by pressing the pedal becomes a primary pedal effort section in which pedal effort is slowly increased. Therefore, the predetermined interval 'd' may be set to an appropriate value in consideration of a pedal ratio.

The hydraulic pressure transmission cross-sectional area of the first piston 200 is formed to be smaller than the hydraulic pressure transmission cross-sectional area of the second piston 400, and as a result, an effect in which the pedal effort is slowly increased in the primary pedal effort section may be exhibited.

When the first piston 200 is continuously moved, the first piston 200 and the second piston 400 come into contact with each other, and then are moved together. That is, when the section in which the first piston 200 is moved by the predetermined interval 'd' ends, the first piston 200 and the second piston 400 are moved together. In this case, a hydraulic pressure transmission cross-sectional area, which produces hydraulic pressure that is transmitted to the wheel cylinder through the hydraulic line 500, is identical to the sum of the hydraulic pressure transmission cross-sectional area S1 of the first piston 200 and the hydraulic pressure transmission cross-sectional area S2 of the second piston 400.

Figure 2:
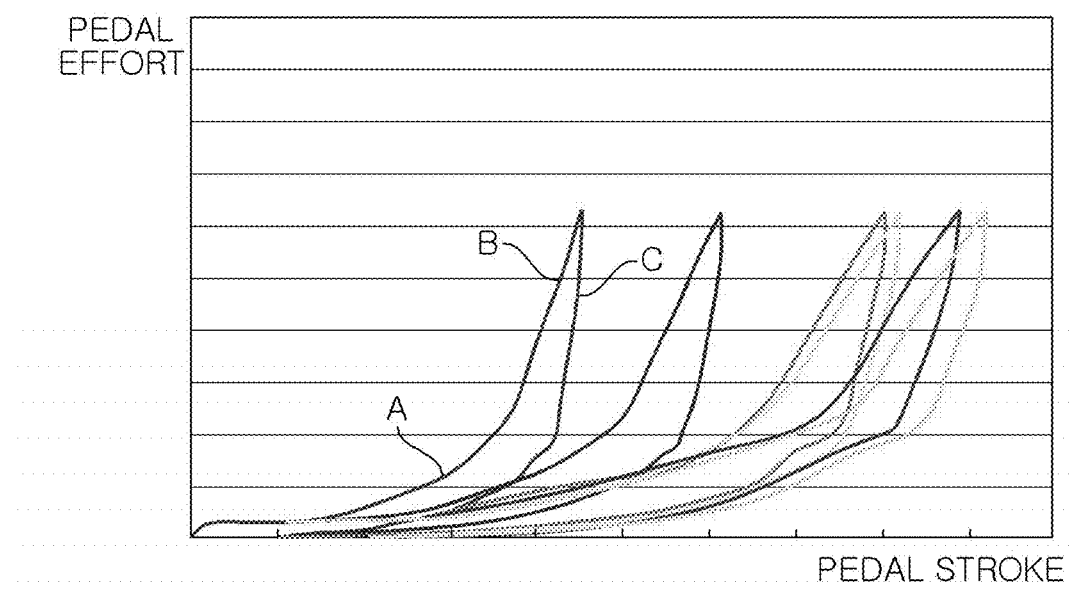
FIG. 2 is a graph illustrating a relationship between pedal effort and a pedal stroke of a driver in a general hydraulic brake system.

Therefore, the hydraulic pressure transmission cross-sectional area is increased in this section such that pedal effort is rapidly increased when the pedal is pressed, thereby forming a secondary pedal effort section, as illustrated in the graph of FIG. 2.

According to the aforementioned operation, a pedal feel, which is similar to a pedal feel in the existing hydraulic brake system, may be implemented without using a booster, thereby minimizing pedal heterogeneity felt by the driver.

As such, according to the master cylinder 1 of the present invention, there is an effect in that a pedal feel, which is similar to a pedal feel in a hydraulic brake system that uses a booster, may be implemented in the brake system that directly transmits hydraulic pressure without using a booster.

While the first piston 200 is configured as a cylindrical piston having a stepped portion, and the second piston 400 is configured as a general type of piston in the aforementioned exemplary embodiment for easily carrying out the exemplary embodiment, the protective scope of the present invention is not limited thereto, and the first piston 200 does not have to be necessarily configured as the cylindrical piston having the stepped portion, or the second piston 400 does not have to be configured as the general type of piston.

The master cylinder 1 of the present invention may be applied to the hydraulic brake system that does not use a booster, but may be applied to a combined brake system that generally uses an electronic brake and a hydraulic brake together.

That is, in the combined brake system that includes an electronic brake which produces braking force for the front wheels, and a hydraulic brake which produces braking force for the rear wheels, the master cylinder 1 of the present invention, which transmits hydraulic pressure to the hydraulic brake by pressing the pedal, is used, thereby implementing a pedal feel that is similar to a pedal feel in the hydraulic brake system that uses a booster.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A hydraulic brake cylinder comprising:
a cylinder body;
a first piston slidably engaged with the cylinder body and operably connected to a brake pedal for sliding along an axis in response to pressing and releasing of the pedal, wherein the first piston is configured to slide in a first direction of the axis when the pedal is pressed, wherein the first piston is configured to slide in a second direction of the axis opposite to the first direction when the pedal is released;

the first piston comprising a first outer circumference and a second outer circumference that is different from the first outer circumference and is located in the second direction relative to the first outer circumference;

a primary chamber defined between the cylinder body and the first and second outer circumferences of the first piston;

a second piston slidably engaged with the cylinder body for sliding along the axis relative to the cylinder body;

a first spring interposed between the first piston and the second piston;

a secondary chamber defined between the cylinder body and the second piston;

a second spring provided within the secondary chamber;

a hydraulic line interconnecting the primary chamber and the secondary chamber without any intervening valve, and further interconnecting the primary chamber and the secondary chamber to a wheel cylinder for fluid communication therebetween;

the first piston comprising a first abutment portion facing the second piston; and the second piston comprising a second abutment portion facing the first piston, wherein the first piston, the first spring, the second piston and the second spring are arranged in order in the first direction along the axis such that the first piston abuts the first spring which abuts the second piston which abuts the second spring, wherein the first piston is at a no-load position in the axis when the pedal is not pressed, wherein at the no-load position, the first and second pistons are apart from each other such that the first and second abutment portions are apart from each other, wherein, as the pedal is pressed, the first piston is configured to slide in the first direction from the no-load position until the first abutment portion of the first piston reaches and contacts the second abutment portion of the second piston, during which the first spring is configured to be compressed and provide force to the first piston in the second direction, wherein as the first piston slides in the first direction from the no-load position, at least part of the second outer circumference replaces at least part of the first outer circumference in defining the primary chamber such that the primary chamber's volume decreases, wherein, as the pedal is further pressed after the first abutment portion reaches and contacts the second abutment portion, the first piston is configured to slide further in the first direction and to push the second piston in the first direction, during which the second spring is configured to be compressed and provide force to the first and second pistons in the second direction.

2. The cylinder of claim 1, wherein the first piston is formed in a cylindrical shape having a stepped portion to provide the first and second outer circumferences.

3. The cylinder of claim 1, further comprising:
a connecting chamber between the primary chamber and the secondary chamber and connected with a reservoir.

4. The cylinder of claim 1, further comprising a stopper configured to prevent the second piston from sliding in the second direction further therefrom.

5. The cylinder of claim 1, wherein a hydraulic pressure transmission cross-sectional area of the first piston is smaller than a hydraulic pressure transmission cross-sectional area of the second piston.

6. A brake system comprising:
an electronic brake configured to produce braking force for a front wheel;
a hydraulic brake configured to produce braking force for a rear wheel; and
the cylinder of claim 1 configured to transmit hydraulic pressure to the hydraulic brake when the pedal is pressed.

7. The brake system of claim 6, wherein the first piston is formed in a cylindrical shape having a stepped portion to provide the first and second outer circumferences.

8. The brake system of claim 6, further comprising:
a connecting chamber between the primary chamber and the secondary chamber and connected with a reservoir.

9. The brake system of claim 6, further comprising a stopper configured to prevent the second piston from sliding in the second direction further therefrom.

10. The brake system of claim 6, wherein a hydraulic pressure transmission cross-sectional area of the first piston is smaller than a hydraulic pressure transmission cross-sectional area of the second piston.

11. The cylinder of claim 1, wherein the first outer circumference has a first radius and the second outer circumference has a second radius greater than the first radius.

12. The cylinder of claim 11, wherein a cross-section of the primary chamber taken by a plane perpendicular to the axis is annular.

13. The cylinder of claim 11, wherein the primary chamber has a first annular cross-section taken by a first plane perpendicular to the axis and a second annular cross-section taken by a second plane perpendicular to the axis, wherein the first annular cross-section has a first area and the second annular cross-section has a second area smaller than the first area.

* * * * *